(12) United States Patent
Dong et al.

(10) Patent No.: US 11,454,739 B2
(45) Date of Patent: Sep. 27, 2022

(54) METHOD OF FABRICATING ALL-DIELECTRIC FLAT LENS WITH LOW REFRACTIVE INDEX

(71) Applicant: Sun Yat-Sen University, Guangdong (CN)

(72) Inventors: Jianwen Dong, Guangdong (CN); Zhibin Fan, Guangdong (CN); Yujie Chen, Guangdong (CN); Zengkai Shao, Guangdong (CN); Siyuan Yu, Guangdong (CN)

(73) Assignee: Sun Yat-Sen University, Guangdong (CN)

( * ) Notice: Subject to any disclaimer, the term of this patent is extended or adjusted under 35 U.S.C. 154(b) by 727 days.

(21) Appl. No.: 16/474,931

(22) PCT Filed: Apr. 13, 2018

(86) PCT No.: PCT/CN2018/082920
§ 371 (c)(1),
(2) Date: Jun. 28, 2019

(87) PCT Pub. No.: WO2019/196077
PCT Pub. Date: Oct. 17, 2019

(65) Prior Publication Data
US 2019/0339417 A1 Nov. 7, 2019

(30) Foreign Application Priority Data
Apr. 8, 2018 (CN) .......................... 201810307848.7

(51) Int. Cl.
*G02B 1/00* (2006.01)
*G02B 3/00* (2006.01)
(Continued)

(52) U.S. Cl.
CPC ............... *G02B 1/002* (2013.01); *G02B 3/00* (2013.01); *G02B 5/1809* (2013.01);
(Continued)

(58) Field of Classification Search
CPC ........ G02B 1/002; G02B 3/00; G02B 5/1809; G02B 5/1847; G02B 5/1871; G02B 5/201;
(Continued)

(56) References Cited

U.S. PATENT DOCUMENTS 9,151,891 B2 10/2015 Ma et al.
2017/0160473 A1* 6/2017 Mazur .................... G02B 6/136
(Continued)

FOREIGN PATENT DOCUMENTS

CN 101604034 A 12/2009
CN 105487145 A 4/2016
(Continued)

OTHER PUBLICATIONS

Chen, X., Chen, M., Mehmood, M.Q., Wen, D., Yue, F., Qiu, C.-W. and Zhang, S. (2015), Longitudinal Multifoci Metalens for Circularly Polarized Light. Advanced Optical Materials, 3: 1201-1206 (Year: 2015).*
(Continued)

*Primary Examiner* — Balram T Parbadia
*Assistant Examiner* — Matthew Y Lee
(74) *Attorney, Agent, or Firm* — Lerner, David, Littenberg, Krumholz & Mentlik, LLP

(57) ABSTRACT

A method is disclosed of fabricating all-dielectric flat lens with low refractive index comprising: selecting dielectric substrate material and lens structure material; determining incident wavelength; calculating phase modulation corresponding to each pillar unit; periodically sampling circular area of dielectric substrate with radius to obtain plurality of
(Continued)

sampling points; calculating phase modulation required at position of each sampling point; obtaining pillar corresponding to each sampling point; arranging different dielectric pillars with low refractive index and same thickness are arranged on dielectric substrate, thereby obtaining all dielectric flat lens with low refractive index. Also disclosed is method of fabricating all-dielectric flat lens with low refractive index that fabricates plane divergent lens with high transmission in wavelength range of visible light, and providing all-dielectric flat lens with low refractive index to improve transmission in visible light region through using dielectric with low refractive index to replace metal and dielectric with high refractive index.

4 Claims, 5 Drawing Sheets

(51) Int. Cl.
G02B 5/20 (2006.01)
G02B 27/00 (2006.01)
G02B 5/18 (2006.01)

(52) U.S. Cl.
CPC ......... *G02B 5/1847* (2013.01); *G02B 5/1871* (2013.01); *G02B 5/201* (2013.01); *G02B 27/0012* (2013.01)

(58) Field of Classification Search
CPC .... G02B 27/0012; G02B 5/1842; G02B 1/02; G02B 1/007; G02F 2202/30
See application file for complete search history.

(56) References Cited

U.S. PATENT DOCUMENTS

2018/0216797 A1* 8/2018 Khorasaninejad ..... H04N 13/25
2018/0292644 A1* 10/2018 Kamali ................ G02B 5/0268
2019/0154877 A1* 5/2019 Capasso ................... G02B 1/00
2019/0196068 A1* 6/2019 Tsai ........................ G02B 5/008

FOREIGN PATENT DOCUMENTS

CN 106094066 A 11/2016
CN 107315206 A 11/2017
WO 2011100070 A1 8/2011

OTHER PUBLICATIONS

International Search Report for PCT/CN2018/082920, dated Dec. 6, 2018.

* cited by examiner

METHOD OF FABRICATING ALL-DIELECTRIC FLAT LENS WITH LOW REFRACTIVE INDEX

CROSS REFERENCE TO RELATED APPLICATIONS

The present application is a national phase entry under 35 U.S.C. § 371 of International Application No. PCT/CN2018/082920, filed Apr. 13, 2018, which claims priority from Chinese Patent Application No. 201810307848.7, filed on Apr. 8, 2018, the disclosures of which are hereby incorporated herein by reference.

TECHNICAL FIELD

The present invention relates to the field of micro-nano optics and optical imaging, and more specifically, relates to a method of fabricating an all-dielectric flat lens with low refractive index.

BACKGROUND

In geometrical optics, a traditional optical lens is limited by strict geometric relationships. A lens profile and an natural optical material are required to implement refractive/reflective imaging, leading to low degree of design freedom and bulky size of an optical lens, which are not conducive to the integrated, portable and miniaturized development of optoelectronic technologies and applications. With the development of nano-fabrication technology, optical imaging technology has ushered in a new leap. An optical metasurface can precisely manipulate the properties of light at a nanoscale, including wavelength, amplitude, phase, polarization and so on. Compared with the traditional optical lens, a flat lens composed of nanostructures combines the technologies of traditional optical imaging and modern optical metamaterial, and hence has obvious advantages such as high degree of freedom in manipulation, rich optical characteristics, high degrees of portability and integration.

Although optical the flat lens can be lightweight and extremely thin by means of the micro-nano technologies, the materials it uses are mostly metal or dielectric materials with high refractive index, such as gold and silicon, leading to the working bandwidth of near infrared and hence large absorption and low transmission for visible light.

SUMMARY OF THE INVENTION

The present invention provides a method of fabricating an all-dielectric flat lens with low refractive index in order to overcome the abovementioned technical problems of the prior art, that is, the materials in the optical flat lens fabricated by micro-nano technology are mostly metal or dielectric material with high refractive index, leading to considerably large absorption and low transmission for the visible light.

To solve the abovementioned technical problems, the technical solution adopted by the present invention is as follows.

A method of fabricating an all-dielectric flat lens with low refractive index comprises steps as follows:

S1: selecting a dielectric substrate material and a lens structure material from an all-dielectric material with low refractive index, and this all-dielectric material is composed of dielectric pillars with a low refractive index not less than 2.5;

S2: determining an incident wavelength λ in a range of visible light from 390 nm to 780 nm;

S3: according to the selected dielectric substrate material and the lens structure material, selecting the pillars with determined thickness and a periodic arrangement, and according to each pillar with the selected periodic arrangement, calculating a phase modulation corresponding to each pillar unit;

S4: determining a lens radius R, a lens focal length f, and a lens type, and periodically sampling a circular area of a dielectric substrate with a radius of R to obtain a plurality of sampling points;

S5: calculating a phase modulation required at a position r of each sampling point, and a calculation formula thereof is:

$$\text{for a divergent lens: } \phi(r) = \frac{2\pi}{\lambda}\left(\sqrt{r^2 + f^2} - |f|\right)$$

$$\text{for a convergent lens: } \phi(r) = -\frac{2\pi}{\lambda}\left(\sqrt{r^2 + f^2} - |f|\right)$$

wherein r is a distance to a center of the flat lens;

S6: comparing the obtained phase modulation with the phase modulation corresponding to each pillar unit obtained in the step S3 to obtain the pillar corresponding to each sampling point;

S7: according to the obtained pillars, arranging different dielectric pillars with low refractive index and same thickness on the dielectric substrate, thereby obtaining the all-dielectric flat lens with low refractive index.

In particular, the substrate material with low refractive index and the lens structure material mentioned in the step S1 are quartz, silicon nitride, titanium dioxide, diamond, silicon dioxide or gallium nitride.

In particular, the thickness of the pillars mentioned in the step S3 is 0.2λ to 3λ, that is a wavelength or sub-wavelength scale, wherein X is an incident wavelength.

In particular, said pillars in the step S3 are seen from a top view as a circle, a square or a plane pattern having a rotational symmetry of 90°.

In comparison with the prior art, the beneficial effects of the present invention are described as followings.

The present invention provides a method of fabricating an all-dielectric flat lens with low refractive index that fabricates a flat divergent lens with high transmission in a wavelength range of visible light from 480 nm to 780 nm, providing the all-dielectric flat lens with low refractive index to improve transmission in a visible light region through a method of using a dielectric with low refractive index to replace a metal and a dielectric with high refractive index.

DETAILED DESCRIPTION OF THE PREFERRED EMBODIMENT

The accompanying drawings are merely used for exemplary illustration and cannot be interpreted as a limit to the present invention.

In order to better illustrate the embodiment of the present invention, certain components in the accompanying drawings will be omitted, zoomed in or zoomed out, and do not represent the size of the actual product.

To those skilled in the art, it can be understood that certain commonly known structure and its explanation in the accompanying drawings can be omitted.

Further illustration is made to the technical scheme of the present invention in conjunction with the accompany drawings and embodiment as follows.

Embodiment 1

Figure 1:
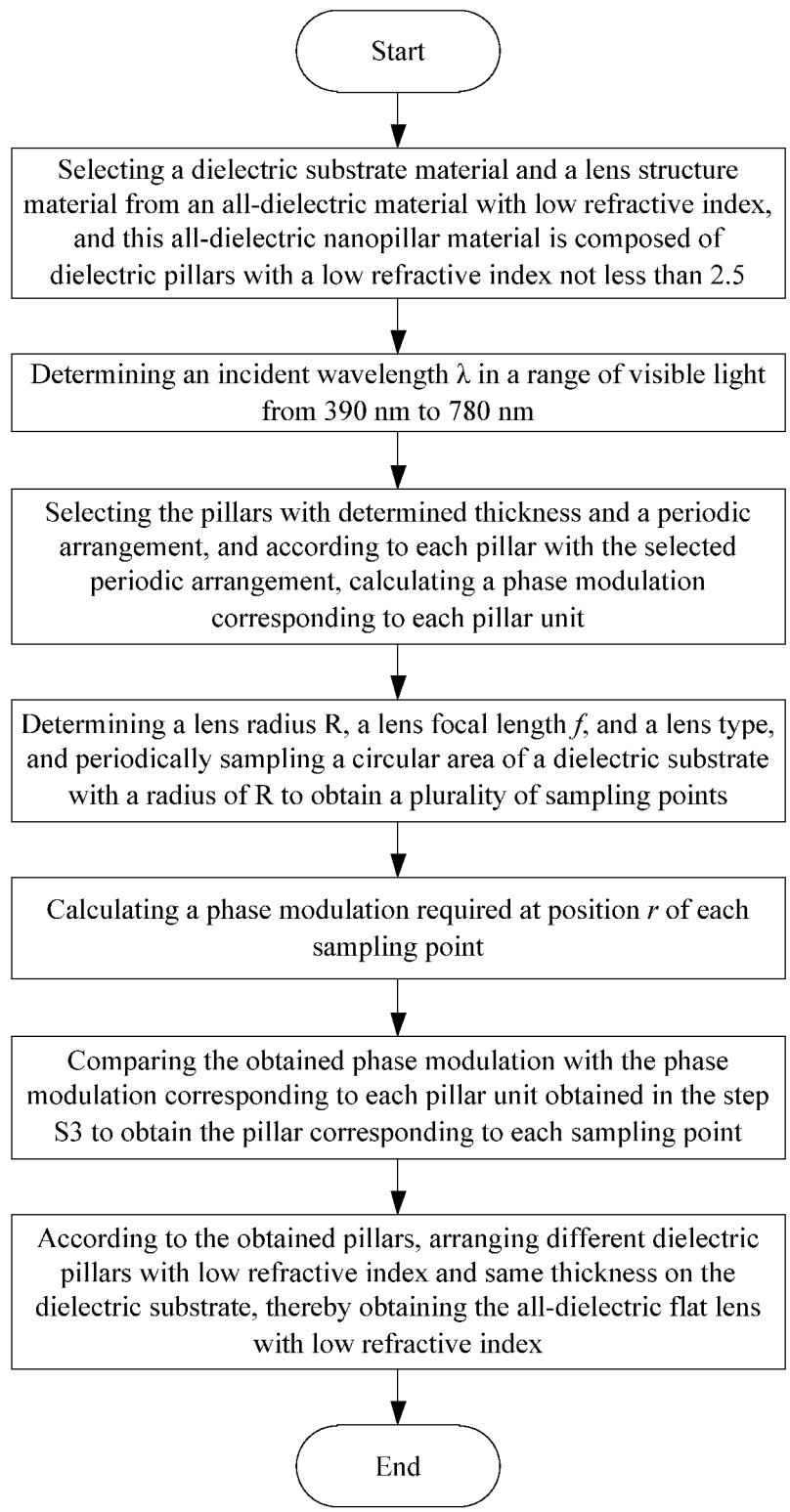
FIG. 1 is a flow diagram of a method of fabricating an all-dielectric flat lens with low refractive index.
Figure 2:
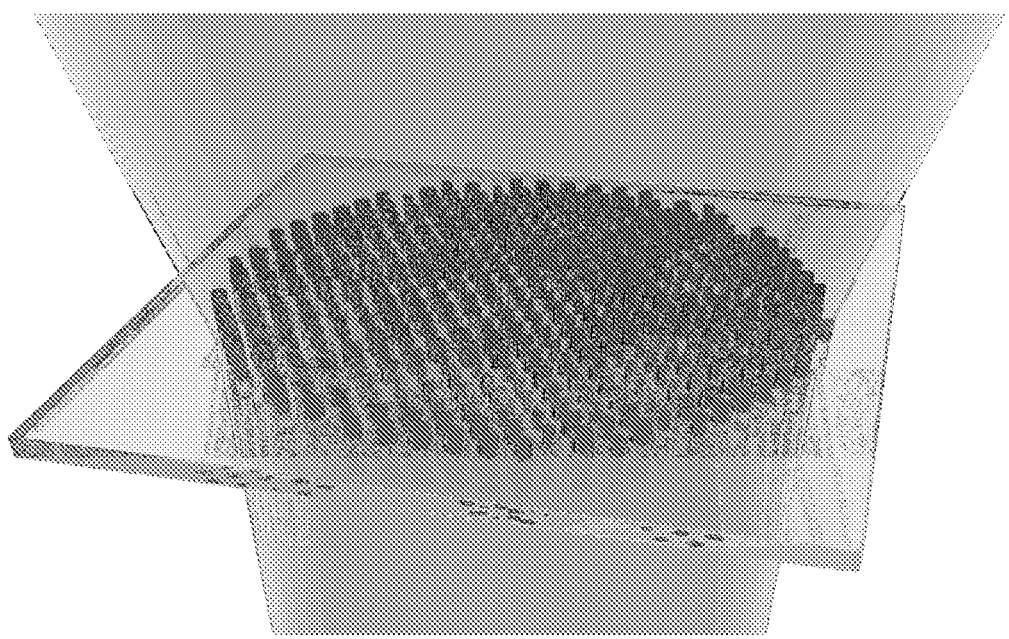
FIG. 2 is a schematic diagram of an all-dielectric flat divergent lens with low refractive index.
Figure 3:
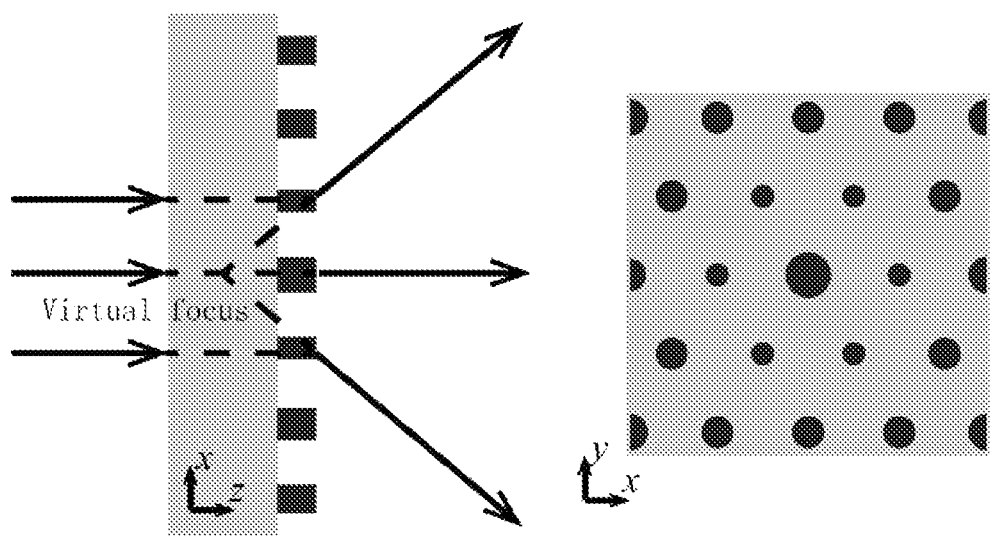
FIG. 3 is a schematic diagram of that a plane wave passes through a diverging lens and a virtual focus then appears at its rear after modulation.

As shown in FIGS. 1 to 3, a method of fabricating an all-dielectric flat lens with low refractive index comprises steps as follows:

S1: selecting a dielectric substrate material and a lens structure material from an all-dielectric material with low refractive index, and this all-dielectric nanopillar material is composed of dielectric pillars with a low refractive index not less than 2.5;

S2: determining an incident wavelength λ in a range of visible light from 390 nm to 780 nm;

S3: according to the selected dielectric substrate material and the lens structure material, selecting the pillars with determined thickness and a periodic arrangement, and according to each pillar with the selected periodic arrangement, calculating a phase modulation corresponding to each pillar unit;

S4: determining a lens radius R, a lens focal length f, and a lens type, and periodically sampling a circular area of a dielectric substrate with a radius of R to obtain a plurality of sampling points;

S5: calculating a phase modulation required at a position r of each sampling point, and a calculation formula thereof is:

$$\text{for a divergent lens: } \phi(r) = \frac{2\pi}{\lambda}\left(\sqrt{r^2 + f^2} - |f|\right)$$

$$\text{for a convergent lens: } \phi(r) = -\frac{2\pi}{\lambda}\left(\sqrt{r^2 + f^2} - |f|\right)$$

wherein r is a distance to a center of the flat lens;

S6: comparing the obtained phase modulation with the phase modulation corresponding to each pillar unit obtained in the step S3 to obtain the pillar corresponding to each sampling point;

S7: according to the obtained pillars, arranging different dielectric pillars with low refractive index and same thickness on the dielectric substrate, thereby obtaining the all-dielectric flat lens with low refractive index.

More specifically, the substrate material with low refractive index and the lens structure material mentioned in the step S1 are quartz, silicon nitride, titanium dioxide, diamond, silicon dioxide or gallium nitride.

More specifically, the thickness of the pillars mentioned in the step S3 is 0.2λ to 3λ, that is a wavelength or sub-wavelength scale, wherein X is an incident wavelength.

More specifically, the pillars mentioned in the step S3 are seen from a top view as a circle, a square or a plane patter having a rotational symmetry of 90°.

In a specific implementation process, said lens including the substrate is made of all-dielectric material with low refractive index, and is composed of dielectric pillars with a low refractive index of 2.5 or less.

In a specific implementation process, an incident wavelength is selected as λ=633 nm, a substrate material is selected as silicon dioxide and has a refractive index of 1.45, and a lens structure material is selected as silicon nitride and has a refractive index of 2; a selected lens sampling method is hexagonal sampling, that is, the pillars are cylindrical structures arranged in hexagons, and selected with a periodic lattice constant of 416 nm and a pillar thickness of 695 nm; the field distribution, amplitude and phase modulation of the periodic nanopillars are calculated by simulation; a lens radius is determined to be R=50 μm, a focal length of the lens is determined to be f=10 μm, and then a numerical aperture of the lens is NA≈0.98. The lens is determined to be a divergent flat lens, and a formula for solving the phase distribution of the divergent lens in the case of normal incidence is as follows:

$$\phi(r) = \frac{2\pi}{\lambda}\left(\sqrt{r^2 + f^2} - |f|\right)$$

wherein r is the distance to the center of the flat lens, the phase modulation required for each sampling point of the lens can be obtained; the calculated results of the phase modulation required for the sampling points are compared with the field distribution, amplitude and phase modulation of the periodic cylindrical nanostructures calculated by simulation. The cylindrical nanostructures required for each sampling point are obtained and arranged on the substrate to realize the flat lens.

In a specific implementation process, as shown in FIG. 3, when an incident light is incident on this flat lens, a corresponding virtual focus is observed from the rear of the flat lens.

Figure 7:
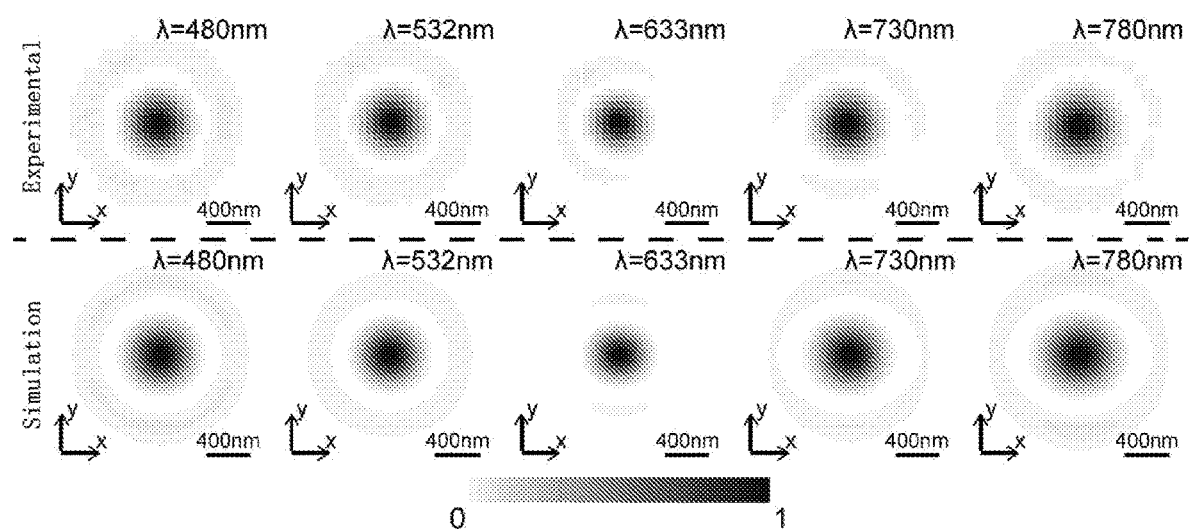
FIG. 7 is simulated and experimental results of virtual focal spots of a flat lens at different wavelengths of incident light in Embodiment 1.
Figure 8:
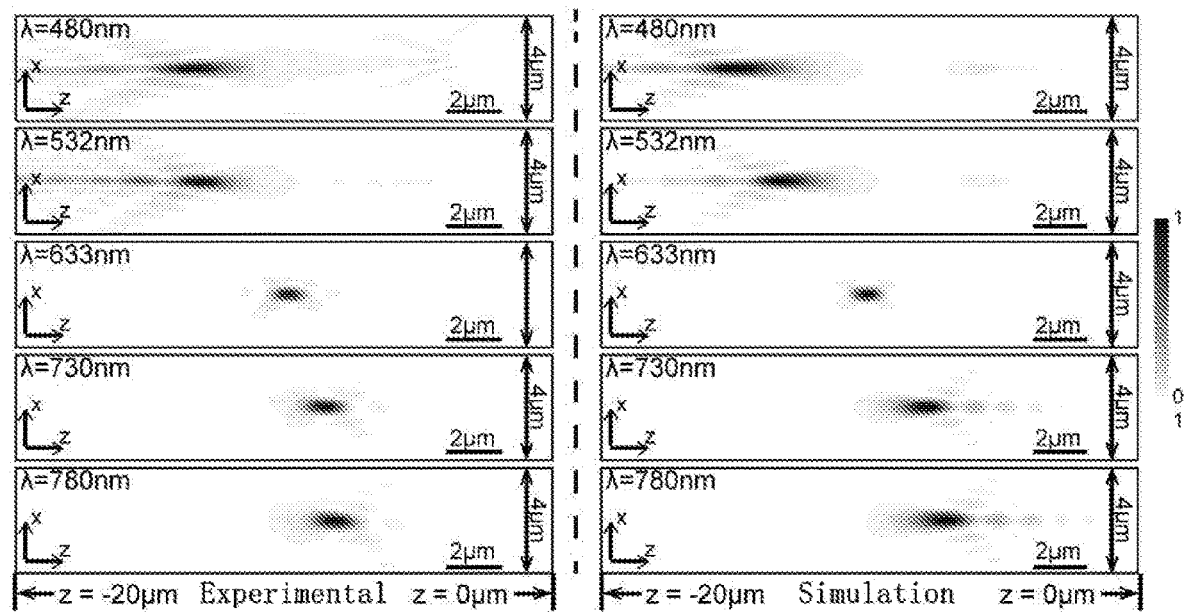
FIG. 8 is simulated and experimental results of longitudinal sections near virtual focuses of a flat lens at different wavelengths of incident light in Embodiment 1.
Figure 9:
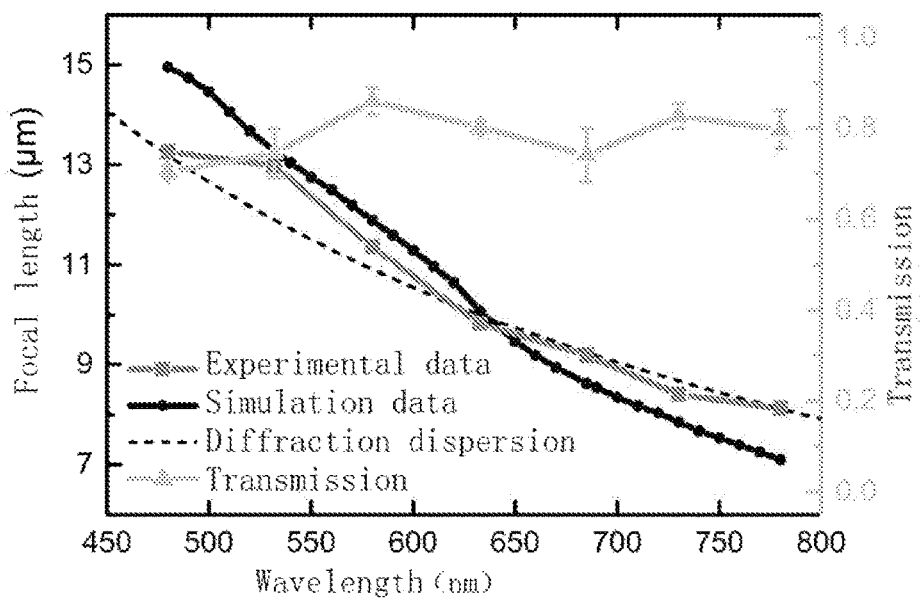
FIG. 9 is a diagram showing virtual focal lengths and transmissions of a flat lens at different wavelengths of incident light in Embodiment 1.

More specifically, as shown in FIGS. 7 to 9, the results are simulated with normal incident light at different wavelengths with the obtained flat lens. The flat lens has better modulation effect for light at different wavelengths and better focal spot effect.

Embodiment 2

Figure 4:
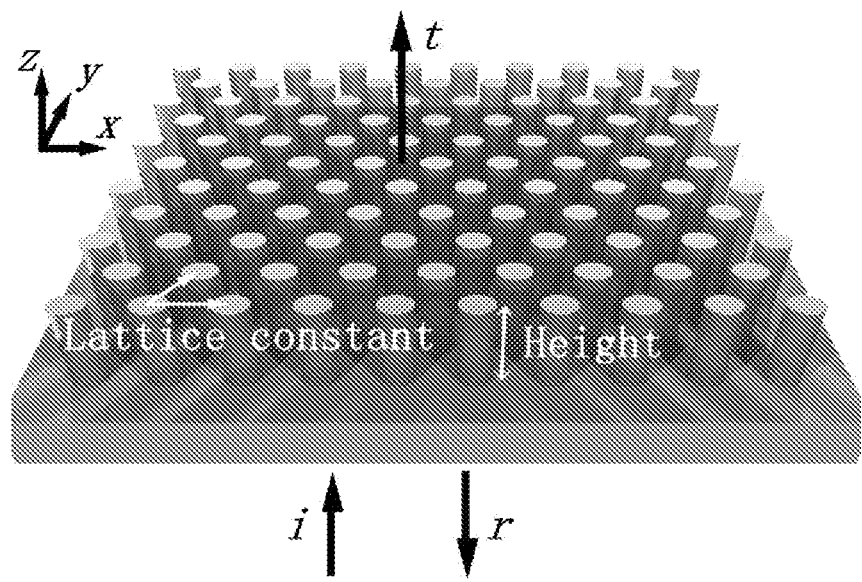
FIG. 4 is a schematic diagram of a periodic cylindrical nanostructure unit.
Figure 5:
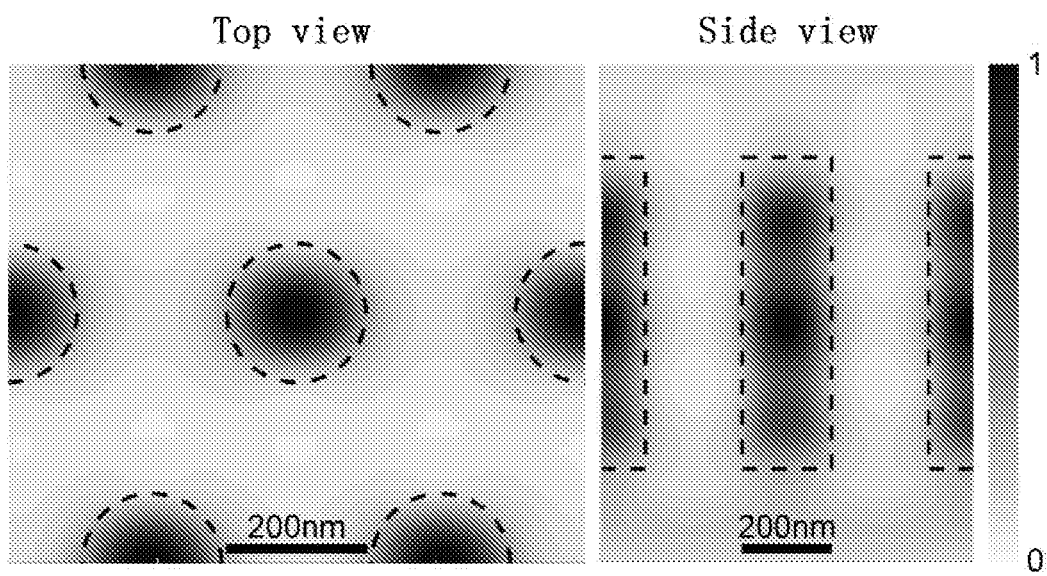
FIG. 5 is simulated results (top and side views) of a magnetic field distribution of a periodic cylindrical structure with a diameter of 200 nm.
Figure 6:
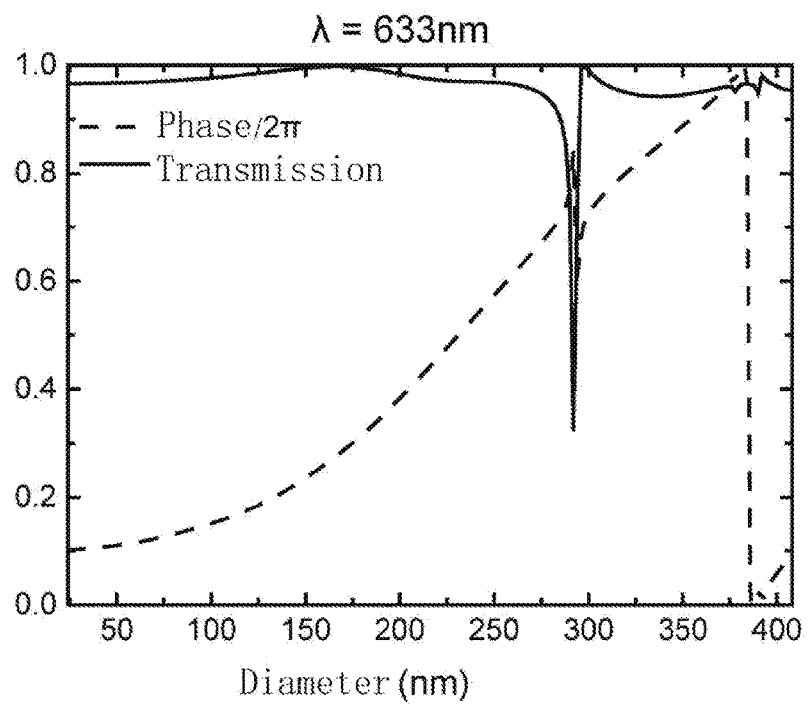
FIG. 6 is simulated results of phase and amplitude modulations of periodic cylindrical structures with different diameters.

As shown in FIGS. 4 to 6, an incident wavelength is selected as λ=633 nm, a substrate material is selected as silicon dioxide and has a refractive index of 1.45, and a lens structure material is selected as silicon nitride and has a refractive index of 2;

a selected lens sampling method is hexagonal sampling, that is, pillars are cylindrical structures arranged in hexagons, and selected with a periodic lattice constant of 416 nm and a pillar thickness of 695 nm;

the field distribution, amplitude and phase modulation of the periodic cylindrical nanostructures are calculated by simulation, and its simulation results are obtained;

a lens diameter is determined to be D=1 cm, a focal length of the lens is determined to be f=4 mm, and then a numerical aperture of the lens is NA≈0.78. The lens is determined to be a divergent flat lens, and a formula for solving the phase distribution of the divergent lens in the case of normal incidence is as follows:

$$\phi(r) = \frac{2\pi}{\lambda}\left(\sqrt{r^2 + f^2} - |f|\right)$$

wherein r is the distance to the center of the flat lens, the phase modulation required for each sampling point of the lens can be obtained; the calculated result of the phase modulation required for the sampling points is compared with the field distribution, amplitude and phase modulation of the periodic cylindrical nanostructures calculated by simulation. The cylindrical nanostructures required for each sampling point are obtained and arranged on the substrate to obtain the flat lens.

Obviously, the above embodiments are merely examples made for clearly illustrating the present invention rather than limiting the embodiments of the present invention. To one with ordinary skills in the art, other forms of modifications or variants can be made based on the above description. There is no need and also impossible to put forward an exhaustive list of all embodiments. Any modifications, equivalent substitutions and improvements made within the spirit and principle of the present invention shall all be included within the scope of protection claimed in the present invention.

What is claimed:

1. A method of fabricating an all-dielectric flat lens with low refractive index, characterized in that, the method comprises steps as follows:
   S1: selecting a dielectric substrate material and a lens structure material from an all-dielectric material with low refractive index, and this all-dielectric material is composed of dielectric pillars with a low refractive index not less than 2.5;
   S2: determining an incident wavelength λ in a range of visible light from 390 nm to 780 nm;
   S3: according to the selected dielectric substrate material and the lens structure material, selecting the pillars with determined thickness and a periodic arrangement, and according to each pillar with the selected periodic arrangement, calculating a phase modulation corresponding to each pillar unit;
   S4: determining a lens radius R, a lens focal length f, and a lens type, and periodically sampling a circular area of a dielectric substrate with a radius of R to obtain a plurality of sampling points;
   S5: calculating a phase modulation required at a position r of each sampling point, and a calculation formula thereof is:

$$\text{for a divergent lens: } \phi(r) = \frac{2\pi}{\lambda}\left(\sqrt{r^2 + f^2} - |f|\right)$$
   $$\text{for a convergent lens: } \phi(r) = -\frac{2\pi}{\lambda}\left(\sqrt{r^2 + f^2} - |f|\right)$$

wherein r is a distance to a center of the plane lens;
   S6: comparing the obtained phase modulation with the phase modulation corresponding to each pillar unit obtained in the step S3 to obtain the pillar corresponding to each sampling point;
   S7: according to the obtained pillars, arranging different dielectric pillars with low refractive index and same thickness on the dielectric substrate, thereby obtaining the all-dielectric flat lens with low refractive index.

2. The method of fabricating the all-dielectric flat lens with low refractive index according to claim 1, wherein the substrate material with low refractive index and the lens structure material mentioned in the step S1 are quartz, silicon nitride, titanium dioxide, diamond, silicon dioxide or gallium nitride.

3. The method of fabricating the all-dielectric flat lens with low refractive index according to claim 1, wherein the thickness of the pillars mentioned in the step S3 is 0.2λ to 3λ, that is a wavelength or sub-wavelength scale, wherein λ is an incident wavelength.

4. The method of fabricating the all-dielectric flat lens with low refractive index according to claim 1, wherein said pillars in the step S3 are seen from a top view as a circle, a square or a plane pattern having a rotational symmetry of 90°.

* * * * *